United States Patent [19]

Kishi et al.

[11] 4,380,048
[45] Apr. 12, 1983

[54] SHIFT CONTROL SYSTEM FOR A VEHICLE AUTOMATIC TRANSMISSION

[75] Inventors: Norimasa Kishi; Tadashi Suzuki, both of Yokosuka, Japan

[73] Assignee: Nissan Motor Co., Ltd., Yokohama, Japan

[21] Appl. No.: 134,986

[22] Filed: Mar. 28, 1980

[30] Foreign Application Priority Data

Apr. 3, 1979 [JP] Japan ................... 54-39351

[51] Int. Cl.³ .................... B60K 41/08; G06F 15/20
[52] U.S. Cl. .................... 364/424.1; 74/866; 364/734
[58] Field of Search ............ 74/866; 340/347 AD; 364/734, 424.1

[56] References Cited

U.S. PATENT DOCUMENTS

| | | | |
|---|---|---|---|
| 3,684,066 | 8/1972 | Kubo et al. ................... | 74/866 X |
| 3,747,438 | 7/1973 | Toyoda et al. ................ | 74/866 |
| 3,879,724 | 4/1975 | McDonald ................. | 340/347 AD |
| 4,027,554 | 6/1977 | Ito et al. ..................... | 74/866 |
| 4,109,772 | 8/1978 | Poore ........................ | 192/0.092 |
| 4,198,882 | 4/1980 | Kiencke et al. ............... | 74/866 |
| 4,262,335 | 4/1981 | Ahlen et al. ................. | 364/424.1 |
| 4,269,281 | 5/1981 | Schneider et al. ............. | 74/866 X |
| 4,280,189 | 7/1981 | Takato et al. ................. | 364/734 |
| 4,282,780 | 8/1981 | Totani et al. ................. | 74/866 |
| 4,285,252 | 8/1981 | Yamaki et al. ................ | 74/866 |

FOREIGN PATENT DOCUMENTS

| | | |
|---|---|---|
| 2001941 | 10/1970 | Fed. Rep. of Germany . |
| 2726115 | 12/1978 | Fed. Rep. of Germany . |
| 2811574 | 9/1979 | Fed. Rep. of Germany . |
| 1439675 | 6/1976 | United Kingdom ............... 364/424 |

OTHER PUBLICATIONS

Mitchell et al., Data Averager for Panel Meter Operates from Meter's Clock Electronics, Apr. 26, 1973, vol. 46, No. 9.
Philippow Taschenbuch Elektrotechnik, vol. 3, Nachrichtentechnik, p. 1555.

Primary Examiner—Felix D. Gruber
Attorney, Agent, or Firm—Lane, Aitken & Kananen

[57] ABSTRACT

At each of a plurality of sub-time intervals within a fixed time interval, the speed and the throttle opening are accumulated sequentially. Averaged values of the speed and the throttle opening derived at every fixed time interval are used together with an averaged associated acceleration to select a correct shift pattern well matched to an actual running condition of the vehicle.

12 Claims, 7 Drawing Figures

| (Address of ROM) | (a,b) | Programmed Acceleration | (Parameter Region in Fig.5A) |
|---|---|---|---|
| Tag1+0=000 | (0,0) | $\alpha_5$ | } 1 |
| Tag1+1=001 | (0,0) | $\alpha_{10}$ | |
| Tag1+2=002 | (1,0) | $\alpha_5$ | } 2 |
| | (1,0) | $\alpha_{10}$ | |
| | ⋮ | | |
| | (7,0) | $\alpha_5$ | } 8 |
| | (7,0) | $\alpha_{10}$ | |
| | (0,1) | $\alpha_5$ | } 9 |
| | (0,1) | $\alpha_{10}$ | |
| | (1,1) | $\alpha_5$ | } 10 |
| | (1,1) | $\alpha_{10}$ | |
| | ⋮ | | |
| Tag1+70=070 | (3,4) | $\alpha_5$ | } 36 |
| Tag1+71=071 | (3,4) | $\alpha_{10}$ | |
| | ⋮ | | |
| Tag1+126=126 | (7,7) | $\alpha_5$ | } 64 |
| Tag1+127=127 | (7,7) | $\alpha_{10}$ | |

SHIFT CONTROL SYSTEM FOR A VEHICLE AUTOMATIC TRANSMISSION

CROSS-REFERENCE TO RELATED APPLICATION

This disclosure of the subject patent application is related to that of Ser. No. 135,155, now U.S. Pat. No. 4,350,057 filed on Mar. 28, 1980 by the present inventors and commonly assigned herewith.

BACKGROUND OF THE INVENTION

1. Field of the Invention

The present invention relates to a shift control system for a vehicle automatic transmission and, particularly, to a shift control system of the type which comprises engine load sensor means for producing a signal corresponding to an engine load; vehicle speed sensor means for generating a signal corresponding to an actual vehicle speed; means responsive to the signals from the engine load sensor means and the vehicle speed sensor means and a signal indicative of an associated shift position of the automatic transmission for determining a programmed acceleration corresponding to the engine load, the actual vehicle speed and the associated shift position of the automatic transmission; means responsive to the signal from the vehicle speed sensor for producing a signal indicating an actual acceleration; and means responsive to the programmed acceleration and the actual acceleration for selecting a required one from predetermined various relationships (shift patterns) between the engine load and a plurality of reference shifting speeds of the automatic transmission, the reference shifting speed corresponding to the engine load taken from a relationship as selected being compared with the actual speed to decide whether shifting of the automatic transmission is necessary or not.

2. Description of the Prior Art

In known shift control systems of this kind, an output signal of the vehicle speed sensor and an output signal of the engine load sensor, for example, a throttle sensor which provides a signal proportional to a throttle opening, are received continuously or at a given time interval, so that from these data and a signal indicating a shift position of the automatic transmission at that time, a programmed acceleration is determined which is to be attained with the associated shift position, throttle opening, and vehicle speed under given running conditions, for example, a running condition on the road having a slope of 5% and that having a slope of 10%. Then, the programmed acceleration thus attained is compared with an actual acceleration derived from the speed signal provided by the vehicle speed sensor in order to determine continually or at a fixed time interval a desired shift pattern, for example, a running pattern for the flat road with its reference shifting speed being set to be low, a running pattern for the road of a small slope (of larger than or equal to 5%) with its reference shifting speed being set slightly high, or a running pattern for the road of a steep slope (of larger than or equal to 10%) with its reference shifting speed being set to be higher.

Figure 1A:
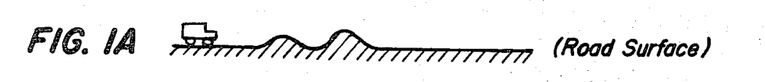
FIG. 1a illustrates diagrammatically a vehicle running upon an uneven road.
Figure 1B:
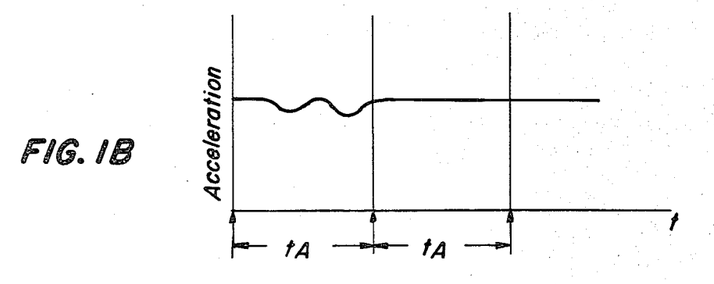

However, there arise problems, for example, when the shift pattern is determined continuously as in the former case, the shift control system may respond to changes in acceleration of the vehicle that occur upon its running on an uneven road as shown in FIGS. 1A and 1B, so that the shift pattern is caused to vary unnecessarily, thereby resulting in undesired change of the vehicle speed and disturbing the stable running of the vehicle.

On the other hand, if the signal from the speed sensor is read into an associated storage means at a fixed time interval $t_A$ as indicated by a pointer mark ▲ in FIG. 1B so that the shift pattern is determined on the basis of an instantaneous value of an acceleration derived from the speed signal at the fixed time interval, it can be seen from FIGS. 1A and 1B that unnecessary changes of the shift pattern by variations in acceleration of the vehicle due to the unevenness of the road are avoided. In this case, however, operation of the sensors in vehicles with considerable noise, vibration, etc. become astable thereby, and, upon reading data into a memory means at the fixed time interval, incorrect input data may be read into the memory means. Particularly, when a throttle sensor of the potentiometer type is used, it may happen that its closed contacts are accidentally opened because of vibration and even that no input data is read into the memory means. Consequently, there is a sufficient problem that an incorrect shift pattern can be selected based upon erroneous input data as described above, whereby a gear or shift position that is not matched to the running condition of the vehicle is carried out. In particular, such a problem is encountered when input data subject to fluctuations due to vibration of the vehicle is read into the memory means at every fixed time interval in succession, a shift pattern to be selected is also caused to be varied at said every fixed time interval in sequence, which may even lead to a sequence of sudden shifting, for example, sequential shifting of the second speed to the third speed and then to the second speed, so that the vehicle becomes very uncomfortable to ride in. In addition, if an incorrect shift pattern has been chosen, a problem occurs such that said incorrect shift pattern is maintained for a predetermined duration of time. Particularly, if said predetermined duration is increased in order to avoid undesired changes of the shift pattern due to the unevenness of the road as mentioned before, an incorrect shift pattern is caused to be sustained for an excessively long duration.

SUMMARY OF THE INVENTION

An object of the invention is to provide a shift control system for an automatic transmission which can remove said problems, wherein the shift pattern is determined based upon mean values which are derived by averaging output signals of a throttle opening sensor and a vehicle speed sensor at each of predetermined time intervals.

A further object of the invention is to provide a shift control system for an automatic transmission, wherein the averaged values of the engine load and the actual vehicle speed within said predetermined time interval are obtained in a manner such that values of the engine load signal and values of the vehicle speed signal are derived and accumulated at each of sub-time intervals within said predetermined time interval and subsequently the engine load signal values and the vehicle speed signal values as accumulated are divided by the number of said sub-time intervals included in said predetermined time interval, respectively.

Another object of the invention is to provide a shift control system for an automatic transmission, wherein the actual acceleration is obtained in a manner such that values of the acceleration are derived and accumulated at each of sub-time intervals within said predetermined time interval and the values as accumulated are divided by the number of said sub-time intervals involved within said predetermined time interval.

Therefore, even if the output signals of the sensors are subject to fluctuations, they are averaged so that it is possible to select a correct shift pattern which is matched to the actual running condition of the vehicle. Moreover, in accordance with the invention, variations in the vehicle speed which occur upon running on an uneven road are also averaged, and consequently, any undesired change of the shift pattern owing to variations of the vehicle speed can be prevented.

BRIEF DESCRIPTION OF THE DRAWINGS

FIG. 1b illustrates diagrammatically variations in acceleration of a vehicle running upon the uneven road of FIG. 1a;

DESCRIPTION OF THE PREFERRED EMBODIMENT

Figure 2:
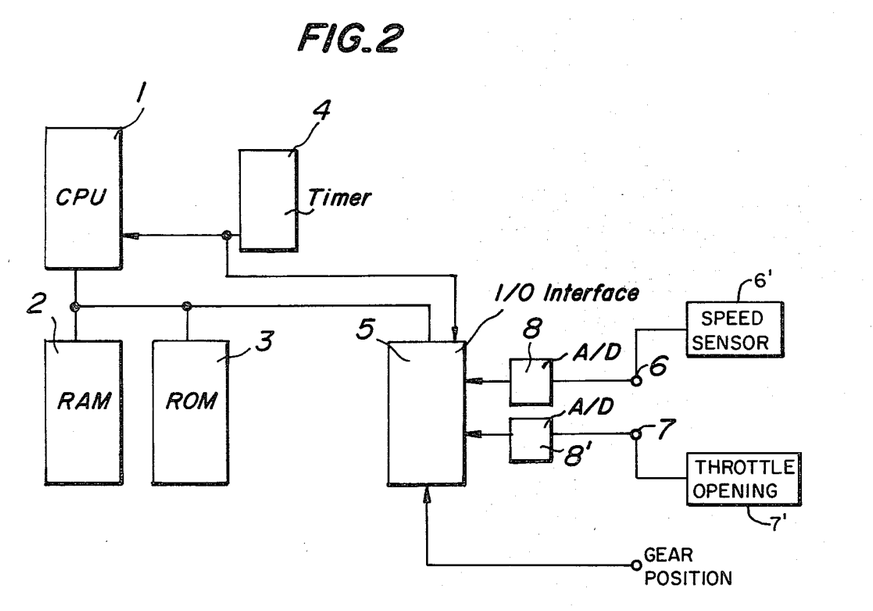
FIG. 2 is a block diagram of a preferred embodiment of the shift control system for an automatic transmission in accordance with the invention.

FIG. 2 shows a block diagram of an embodiment of the shift control system for an automatic transmission in accordance with the invention. This embodiment is implemented by using a microcomputer, and examples of its control program are illustrated in FIGS. 3 and 4, respectively.

In FIG. 2, reference numeral 1 designates a central processing unit (CPU), numeral 2 designates a random access memory (RAM), numeral 3 designates a read only memory (ROM), numeral 4 designates a timer, numeral 5 designates an external input/output interface unit, numeral 6 designates an input terminal for a speed signal from a vehicle speed sensor 6', numeral 7 designates an input terminal for a signal which is fed from a throttle sensor 7' to indicate a throttle opening, and numerals 8 and 8' designate analog-to-digital converters, respectively.

Figure 3:
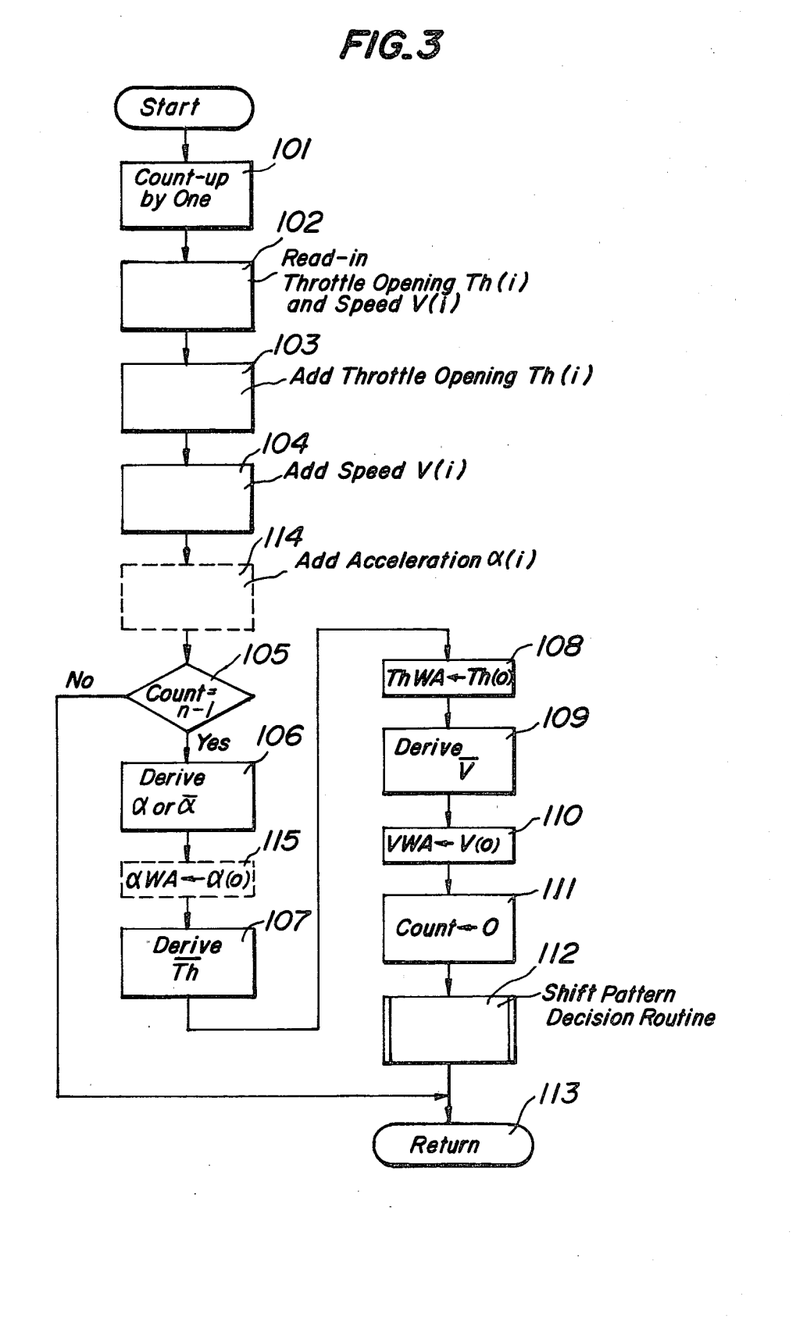
FIG. 3 is an example of a flow chart of a control program which is applied to the system in FIG. 2.
Figure 4:
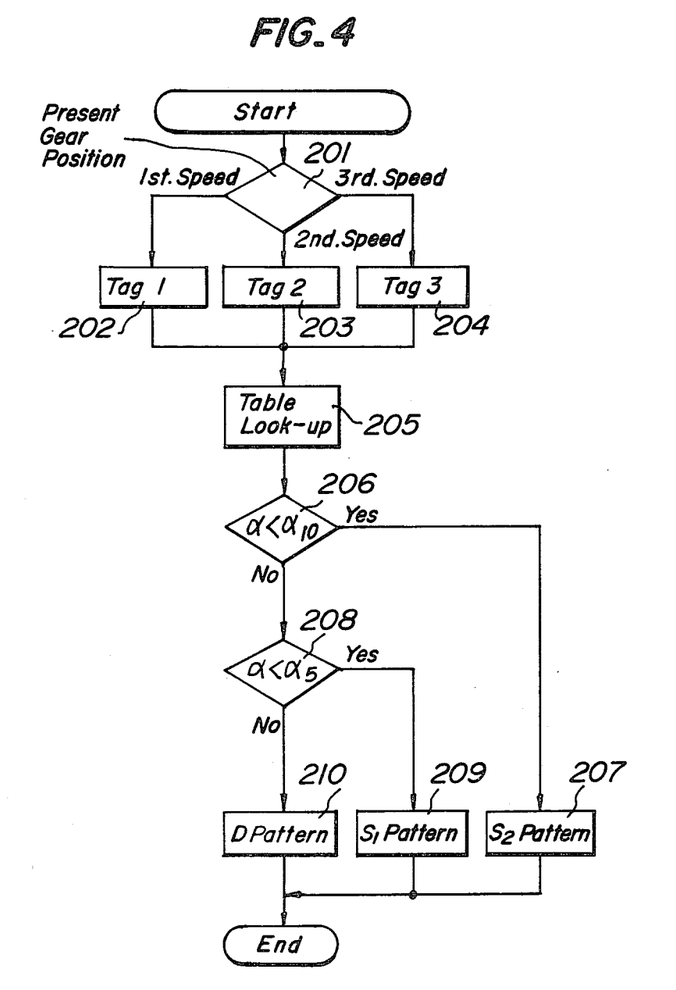
FIG. 4 is an example of a flow chart of a shift pattern decision routine shown in FIG. 3.

At first, the manner in which averaged values of the throttle opening and the vehicle speed are obtained, respectively, will be explained by referring to a flow chart of the control program as shown in FIG. 3.

At the beginning of the control program, each time the CPU 1 receives an interruption signal from the timer 4 at each of predetermined sub-time intervals $t_B$, the CPU 1 operates to count-up the count of a counter in the RAM 2 by one, as indicated by block 101. At the same time, in block 102, data for the vehicle speed and that for the throttle opening, which are supplied to the input terminals 6 and 7 from the speed sensor 6' and the throttle opening sensor 7' and converted into digital form by the analog-to-digital converters 8 and 8', respectively, are read into memory locations in the RAM 2 through the input/output interface unit 5 at each sub-time interval $t_B$. As designated in blocks 103 and 104 the throttle opening data (Th) and the speed data (V) thus read are added in succession and their cumulative added results are stored in memory locations for resultant sum ThWA and VWA in the RAM 2, respectively. Until the count of said counter reaches (n−1), that is to say, a time interval $t_A = (n-1)t_B$ (where n is an integer) is elapsed, the control by the CPU 1 goes from block 105 directly to RETURN block 113, and subsequently said adding operation is repeated. If the count of said counter reaches (n−1), the control of the CPU 1 is shifted from block 105 to a path including blocks 106–112 as shown by the solid lines. In block 106, variation in the vehicle speed within the fixed time interval (the time interval $t_A$), that is to say, an acceleration $\alpha$ within the time interval $t_A$ can be obtained by the following equation:

$$\alpha = \frac{V(n-1) - V(0)}{t_A}$$

where V(0) and V(n−1) are initial and final values of the vehicle speed data stored in the RAM 2 during the time interval $t_A$. In blocks 107 and 109, total sums of the throttle opening data and that of the vehicle speed data, which have been stored in the memory locations for resultant sum ThWA and VWA of the RAM 2 after reading thereinto and then adding at each sub-time interval $t_B$ within every time interval $t_A$, are read out, respectively. From these total sums averaged values of the throttle opening $\overline{Th}$ and the vehicle speed $\overline{V}$ during the time interval $t_A$ are derived in accordance with the following equations, respectively, $$\overline{Th} = \frac{\sum_{i=1}^{n-1} Th(i)}{n-1} \text{ and } \overline{V} = \frac{\sum_{i=1}^{n-1} V(i)}{n-1}$$

(where Th(i) and V(i) represent the i-th throttle opening data and the i-th speed data within the time interval $t_A$, respectively), and said averaged values are stored in the RAM 2, respectively. In blocks 108 and 110, the throttle opening data and the vehicle speed data at the end of the time interval $t_A$ are set as initial values of Th(0) and V(0) to the memory locations for resultant sum ThWA and VWA in the RAM 2, respectively, whereupon the count of said counter is reset to zero. Finally, the control process reaches block 112, wherein a shift pattern is determined from the averaged throttle opening Th, the averaged vehicle speed V and the acceleration obtained as mentioned above.

Arbitrary integers suffice for the multiplication factor n which defines the relation $t_A=(n-1)t_b$. However, it is advantageous that said factor is chosen to a power of two because the dividing operations in the equations for $\alpha$, $\overline{Th}$, and $\overline{V}$ can be carried out by merely shifting bit positions of a binary number corresponding to the multiplication factor in the denominator of said equations. Moreover, in the above example, the acceleration $\alpha$ is not taken as an average for the time interval $t_A$. However, the acceleration can also be obtained as an averaged acceleration in the time interval $t_A$ in a manner such that respective accelerations for a sequence of sub-time intervals $t_B$ within the time interval $t_A$ are found at every sub-time intervals $t_B$ and an acceleration mean value is derived from a total sum of said accelerations. In this case it is executed as shown in block 114 represented by a broken line that until the end of the time interval $t_A$ an acceleration $\alpha(i)$ for the sub-time interval $t_B$ is taken from successive vehicle speed data read in at each sub-time interval $t_B$ in accordance with the following equation: $\alpha(i)=[V(i)-V(i-1)]/t_B$, a total sum is obtained by adding sequentially and storing in a memory location a resultant sum $\alpha AW$ in the RAM 2. At the end of the time interval $t_A$ as shown in block 106, an averaged acceleration $\alpha$ in the time interval $t_A$ can be obtained from the total sum of the respective accelerations in each sub-time interval $t_B$ within the time interval $t_A$ in accordance with the following equation:

$$\overline{\alpha} = \frac{\sum\limits_{i=1}^{n-1} \alpha(i)}{(n-1)}.$$

Then, in block 115 indicated by a broken line, an acceleration for the last sub-time interval $t_B$ of the timer interval $t_A$ which is taken at the end of the latter is stored as an initial value $\alpha(0)$ of acceleration data for the next time interval $t_A$ in a corresponding memory location of the RAM 2.

Now, the manner in which a shift pattern can be determined through a shift pattern decision routine in block 112 from the averaged throttle opening $\overline{Th}$, the averaged vehicle speed $\overline{V}$, and the acceleration $\overline{\alpha}$ or $\alpha$ obtained as described above will be explained by referring, as an example, to a method proposed in U.S. patent application Ser. No. 60,672 filed by K. Yamaki and Y. Morimoto, July 25, 1979 and now U.S. Pat. No. 4,285,252.

FIG. 4 illustrates an example of said shift pattern decision routine in detail, wherein at first, in block 201, a signal representing a present gear position of the automatic transmission is derived, and, in block 202, in the case of the first speed, in block 203 in the case of the second speed, or in block 204 in the case of the third speed a heading address (Tag 1, Tag 2, or Tag 3) in a table of programmed accelerations which are stored for respective gear positions in the ROM 3 (FIG. 2), respectively, is determined.

Figure 5A:
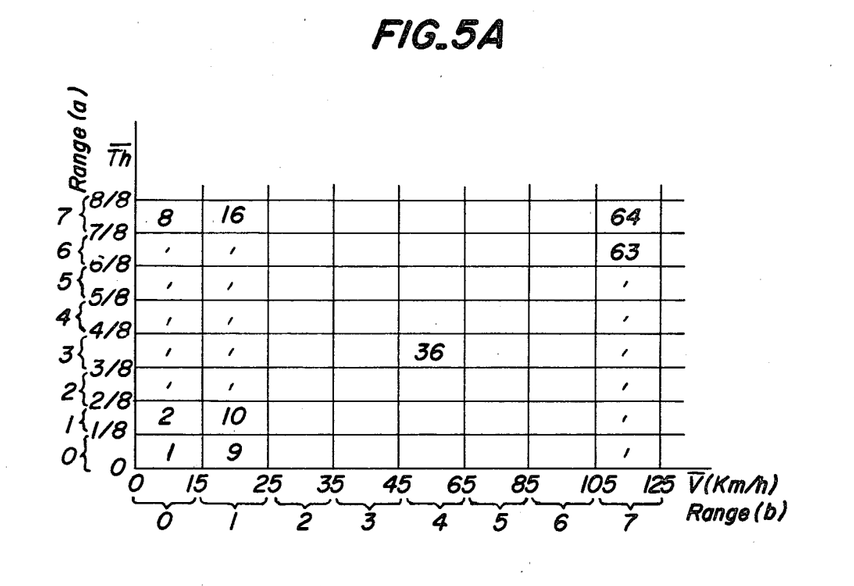
FIG. 5A shows diagrammatically an example of a numbering array relating various running conditions of the vehicle as a function of averaged speed and throttle opening in their respective ranges.
Figure 5B:
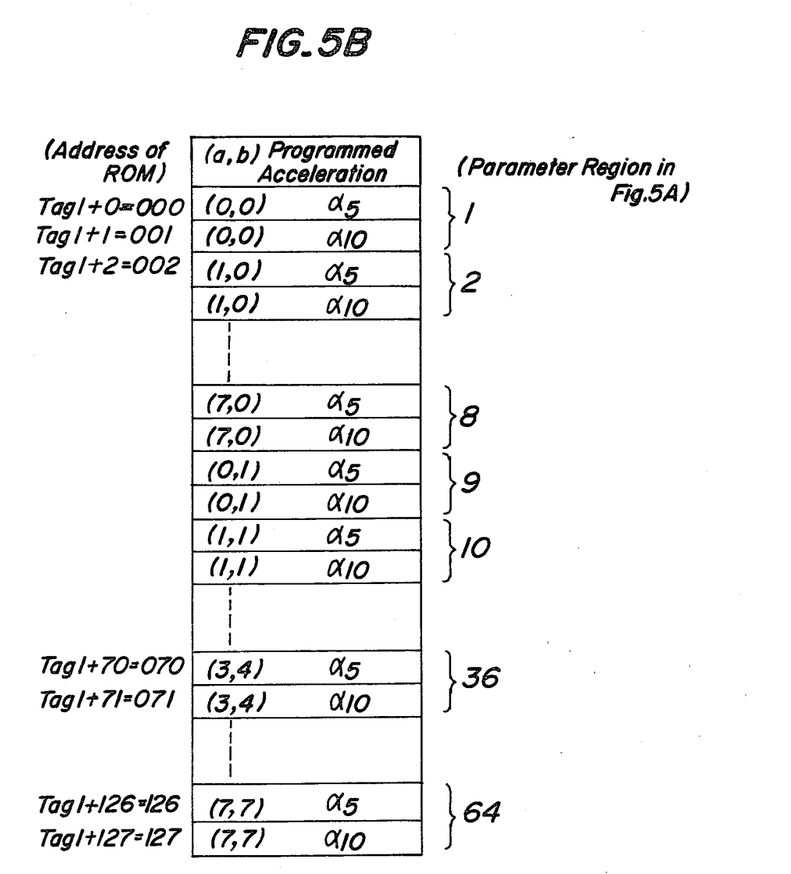
FIG. 5B shows an example of a table of programmed accelerations stored in a ROM in connection with FIG. 5A.

The programmed accelerations are stored previously in the ROM 3, for example, as shown in FIG. 5B in the case of the first speed. That is to say, the throttle opening and the vehicle speed (the averaged values $\overline{Th}$ and $\overline{V}$ in accordance with the invention) are equally divided into eight ranges by a factor of eight, respectively, and range numbers 0-7 are assigned to the throttle opening ranges and the vehicle speed ranges, respectively, as shown in FIG. 5A. Subsequently, the programmed accelerations, for example, the programmed accelerations $\alpha_5$ and $\alpha_{10}$ which are to be obtained for each throttle opening range and each vehicle speed range at each gear position upon running on the road of 5% and 10% slopes, respectively, are stored previously in specified addresses of the ROM 3 for each shift position, as shown in FIG. 5B. Assuming that a heading address of the programmed acceleration table for the first speed in the ROM 3 is Tag 1 and that said ranges for the averaged throttle opening $\overline{Th}$ and those for the averaged speed $\overline{V}$ are represented by a and b, respectively, addresses $\phi_1$ and $\phi_1'$ for the programmed accelerations $\alpha_5$ and $\alpha_{10}$ corresponding to the respective ranges of the averaged values $\overline{Th}$ and $\overline{V}$ at this shift position may be addressed as expressed by the following equations, respectively:

for $\alpha_5 \ldots \phi_1 = 2a + 16b + \text{Tag } 1$ and for $\alpha_{10} \ldots \phi_1' = 2a + 16b + \text{Tag } 1 + 1$.

Therefore, the addresses $\phi_1$ and $\phi_1'$ of the accelerations $\alpha_5$ and $\alpha_{10}$ for a first parameter region or block 1 corresponding to a range set (0, 0) of the averaged values $\overline{Th}$ and $\overline{V}$ shown in FIG. 5A, are Tag 1=000 and Tag 1+1=001 as shown in FIG. 5B, respectively. Moreover, the addresses $\phi_1$ and $\phi_1'$ of the accelerations $\alpha_5$ and $\alpha_{10}$ for a thirty-sixth parameter region or block 36 corresponding to a range set (3, 4) in FIG. 5A are Tag 1+70=070 and Tag 1+71=071, respectively.

Similarly, the programmed accelerations $\alpha_5$ and $\alpha_{10}$ corresponding to the respective ranges of said throttle opening and vehicle speed $\overline{Th}$ and $\overline{V}$ for the second speed upon running on the 5% and 10% slope road are stored previously in the following addresses $\phi_2$ and $\phi_2'$, respectively:

for $\alpha_5 \ldots \phi_2 = 2a + 16b + \text{Tag } 2$ and for $\alpha_{10} \ldots \phi_2' = 2a + 16b + \text{Tag } 2 + 1$.

Also, the programmed accelerations $\alpha_5$ and $\alpha_{10}$ corresponding to the respective ranges of the values $\overline{Th}$ and $\overline{V}$ for the third speed upon running on the 5% and 10% slope road are stored previously in the following addresses $\phi_3$ and $\phi_3'$, respectively:

for $\alpha_5 \ldots \phi_3 = 2a + 16b + \text{Tag } 3$ and for $\alpha_{10} \ldots \phi_3 = 2a + 16b + \text{Tag } 3 + 1$.

Thus, in block 205 of FIG. 4, the table look-up of the programmed accelerations $\alpha_5$ and $\alpha_{10}$ from the ROM 3 which correspond to the present values of the averaged throttle opening and vehicle speed $\overline{Th}$ and $\overline{V}$ at the present shift position, respectively, is executed in accordance with the addresses as defined above from information of shift position determined in blocks 202–204, i.e. the heading address Tag 1, Tag 2 or Tag 3 and from the averaged throttle opening and vehicle speed $\overline{Th}$ and $\overline{V}$ taken at said each time interval $t_A$. In block 206 the actual acceleration $\alpha$ obtained at every time interval $t_A$ is compared with the programmed acceleration $\alpha_{10}$ as read out. If $\alpha < \alpha_{10}$, it is decided that the slope of the road on which the vehicle is running is larger than 10%, and in block 207 a shift pattern $S_2$ for running on the road of more than 10% slope is chosen in which pattern a reference shifting speed at each shift position is set to be higher. On the other hand, if $\alpha > \alpha_{10}$, that is to say, the slope of the road being traveled by the vehicle is smaller than 10%, the actual acceleration $\alpha$ is compared in block 208 with the programmed acceleration $\alpha_5$. If $\alpha < \alpha_5$, that is to say, the slope of the road being traveled by the vehicle is larger than 5%, a shift pattern $S_1$ is chosen in block 209, in which pattern a reference shifting speed at each shift position is set to be slightly higher so as to be suitable for running on the road of more than 5% slope. If $\alpha > \alpha_5$, i.e. the slope of the road being traveled by the vehicle is smaller than 5%, a shift pattern D for running on the flat road is chosen in block 210, in which pattern a reference shifting speed at each shift position is set to be lower.

As can be seen from the foregoing, the shift pattern is determined by the averaged throttle opening, the averaged vehicle speed and acceleration at each of the fixed time intervals in accordance with the invention. Therefore, the selection of any incorrect shift pattern is avoided, which may otherwise happen when a shift pattern is determined by instantaneous values of the throttle opening, the vehicle speed and the acceleration at each of fixed time intervals. Moreover, even when the accelerator pedal is depressed unconsiously or momentarily by the driver, the shift pattern is not caused to be changed because variations of the throttle opening due to such very short term depression of the accelerator pedal are averaged.

It will be evident that the invention is not limited to the embodiments in the Figures and various changes in form and details may be made within the scope of the invention. For example, the table look-up of programmed accelerations from the ROM 3 may be realized in the form of hardware by using an associative memory without addressing as referred to FIG. 5. In another method it is possible to obtain desired programmed accelerations by arithmetic operation through proper arithmetic equations from values of the averaged throttle opening and vehicle speed $\overline{Th}$ and $\overline{V}$. It should be noted that in the embodiment shown in FIG. 2 the timer 104 is provided externally of the CPU 1, however, interruption without the timer 104 may be effected internally of CPU 1 by the latter itself in the form of software timer.

What is claimed is:

1. In a shift control system for an automatic transmission of the type having a plurality of predetermined shift characteristics and of the type for use in an engine powered vehicle, wherein said shift control system includes:

engine load sensor means for producing a signal corresponding to an engine load of a vehicle;

vehicle speed sensor means for producing a signal corresponding to a vehicle speed;

and means for providing a signal indicative of the presently selected one of the shift characteristics of the transmission;

the improvement comprising:

deriving means responsive to the signal from said engine load sensor means for deriving an averaged value of the engine load during a predetermined time interval for each of a succession of said predetermined time intervals;

and responsive to the signal from said vehicle speed sensor means for deriving an averaged value of the vehicle speed during said predetermined time interval for each time interval and for deriving an actual acceleration during each time interval;

means responsive to the signals from said deriving means indicative of the average value of the engine load and the average value of the vehicle speed and a signal from said signal indicator means indicative of the presently selected shift characteristic of the automatic transmission for determining a programmed acceleration as a function of said averaged engine load, said averaged vehicle speed, and the presently selected shift characteristic;

and means responsive to said so-determined programmed acceleration and said actual acceleration for comparing them to each other and discriminating whether or not another one of the transmission shift characteristics is to be selected.

2. A shift control system as claimed in claim 1 wherein said averaged engine load and said averaged vehicle speed within each of said predetermined time intervals are obtained by adding, respectively, in a cumulative manner, the values of the engine load signal and values of the vehicle speed signal during each of a succession of sub-time intervals within said predetermined time interval, and subsequently dividing the cumulative result by the number of said sub-time intervals included in said predetermined time interval.

3. A shift control system as claimed in claim 1, wherein said actual acceleration is obtained during each of said predetermined time intervals by determining the acceleration during each of a succession of sub-time intervals within said predetermined time interval, adding, in a cumulative manner, the sub-time interval acceleration and dividing the cumulative result by the number of sub-time intervals involved within said predetermined time interval.

4. A shift control system as claimed in claim 1, wherein said deriving means, said means for determining a programmed acceleration, and said means for comparing and discriminating are formed by a microcomputer which comprises a central processing unit receiving an interruption signal from a timer, a random access memory and a read only memory which are interconnected to each other and to the central processing unit.

5. A shift control system as claimed in claim 1, wherein said deriving means, said means for determining a programmed acceleration, and said means for comparing and discriminating are formed by a microcomputer which comprises a central processing unit cooperating with an interruption signal from a software timer combined into the central processing unit, a random access memory and a read only memory which are interconnected to each other and to the central processing unit.

6. In a shift control system for an automatic transmission of the type having a plurality of predetermined transmission shift characteristics and of the type for use in an engine powered vehicle, wherein said shift control system includes:

engine load sensing means for providing a signal responsive to engine load;

vehicle speed sensing means for providing a signal responsive to vehicle speed;

and means coupled to the transmission for providing a signal indicative of the presently selected one of the transmission shift characteristics of the transmission;

the improvement comprising:

means connected to said engine load sensing means and said vehicle speed sensing means for determining, respectively, the average value of the engine load and the vehicle speed during each of a succession of predetermined time intervals and for determining the actual vehicle acceleration during each of the succession of predetermined time intervals;

storage means having predetermined vehicle acceleration data stored therein as a function of average engine load, average vehicle speed, and the transmission shift characteristic;

means connected to said storage means and responsive to the so-determined average engine load, vehicle speed, and indicated transmission shift characteristic for obtaining at least one of said predetermined vehicle acceleration values stored as a function of said average engine load, vehicle speed, and indicated transmission shift characteristic; and comparing means for comparing the actual vehicle acceleration and the predetermined acceleration value obtained from said storage means and discriminating whether or not another one of the transmission shift characteristics is to be selected as a function of the comparison.

7. The shift control system claimed in claim 6 wherein:

said engine load sensor derives its engine load responsive signal from a throttle opening signal.

8. The shift control system claimed in claim 6 wherein:

said predetermined time interval is divided into n sub-time intervals, said engine load and vehicle speed being measured during each of said sub-time intervals, the sub-time intervals measurement signals being cumulatively added and the result thereof divided by the number of sub-time intervals in each predetermined time interval to obtain the average engine load and vehicle speed, respectively.

9. The shift control system claimed in claim 6 wherein:

said actual vehicle acceleration is obtained by determining the difference between the vehicle speed at the beginning and at the end of each predetermined time interval and dividing each difference determination by the duration of the time interval.

10. The shift control system claimed in claim 6 wherein said predetermined time interval is divided into n sub-time intervals, said actual vehicle acceleration value being obtained by determining the difference between the vehicle speed at the beginning and end of each sub-time interval, adding the so-determined differences obtained in a cumulative manner and dividing the so-obtained cumulative result by the number of sub-time intervals in each predetermined time interval.

11. In a shift control system for an automatic transmission of the type having a plurality of predetermined shift characteristics and of the type for use in an engine powered vehicle, wherein said shift control system includes:

engine load sensor means for producing a signal corresponding to an engine load of a vehicle;

vehicle speed sensor means for producing a signal corresponding to a vehicle speed;

and means for providing a signal indicative of the presently selected one of the shift characteristics of the transmission;

the improvement comprising:

means (1) responsive to the signal from said engine load sensor means for deriving an averaged value of the engine load during a predetermined time interval for each of a succession of said predetermined time intervals, (2) responsive to the signal from said vehicle speed sensor means for deriving an averaged value of the vehicle speed during said predetermined time interval for each time interval, (3) responsive to the derived averaged values of engine load and vehicle speed and the signal indicative of the presently selected shift characteristic of the automatic transmission for determining a programmed acceleration as a function of said averaged engine load, said averaged vehicle speed, and the presently selected shift characteristic, (4) responsive to the signal indicative of the vehicle speed from said vehicle speed sensor means for deriving an actual acceleration during each of said predetermined time intervals, and (5) responsive to said so-determined programmed acceleration and said actual acceleration for comparing them to each other and discriminating whether or not another one of the predetermined transmission shift characteristics is to be selected.

12. A shift control system for an automatic transmission of the type having a plurality of predetermined transmission shift characteristics and of the type for use in an engine powered vehicle, wherein said shift control system includes:

engine load sensing means for providing a signal responsive to engine load;

vehicle speed sensing means for providing a signal responsive to vehicle speed;

means coupled to the transmission for providing a signal indicative of the presently selected one of the transmission shift characteristics of the transmission;

the improvement comprising:

storage means having predetermined vehicle acceleration data stored therein as a function of average engine load, average vehicle speed, and the transmission shift characteristics;

means connected to said engine load sensing means, said vehicle speed sensing means and said storage means (1) for determining, respectively, the average value of the engine load and the vehicle speed during each of a succession of predetermined time intervals, (2) for determining the actual vehicle acceleration during each of the succession of predetermined time intervals, (3) responsive to the so-determined average engine load, vehicle speed, and indicated transmission shift characteristic for obtaining at least one of said predetermined vehicle acceleration values stored as a function of said average engine load, vehicle speed, and indicated transmission shift characteristic, and (4) for comparing the actual vehicle acceleration and the predetermined acceleration value obtained from said storage means and discriminating whether or not another one of the transmission shift characteristics is to be selected as a function of the comparison.

* * * * *